US012726601B2

(12) United States Patent
Suzuki

(10) Patent No.: US 12,726,601 B2
(45) Date of Patent: Sep. 1, 2026

(54) DISPLAY METHOD, PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventor: Kazumi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 267 days.

(21) Appl. No.: 18/488,177

(22) Filed: Oct. 17, 2023

(65) Prior Publication Data

US 2024/0129443 A1 Apr. 18, 2024

(30) Foreign Application Priority Data

Oct. 17, 2022 (JP) ................................ 2022-166063

(51) Int. Cl.
*H04N 9/31* (2006.01)

(52) U.S. Cl.
CPC ................................ *H04N 9/3185* (2013.01)

(58) Field of Classification Search
CPC .......................... H04N 9/3185; H04N 9/3179
USPC ........................................................ 353/69
See application file for complete search history.

(56) References Cited

U.S. PATENT DOCUMENTS

2011/0149175 A1* 6/2011 Ozawa ................ H04N 9/3185 348/744
2013/0083058 A1* 4/2013 Yoshimura .............. H04N 5/74 345/629
2014/0293133 A1* 10/2014 Saigo .................. H04N 9/3179 348/607
2019/0219907 A1* 7/2019 Kurota ................ H04N 9/3194
2022/0038670 A1* 2/2022 Saigo .................. H04N 9/3147
2022/0270526 A1* 8/2022 Takeuchi ............ H04N 9/3194
2022/0309967 A1* 9/2022 Shishido ............... G09G 3/002

FOREIGN PATENT DOCUMENTS

JP 2011-128686 A 6/2011
JP 2021-136502 A 9/2021

OTHER PUBLICATIONS

Panasonic Corporation, Geometry Manager Pro Manual, May 2021, 23 pgs.
Panasonic Connect Co., Ltd., Software Applications, 6 pgs.
Epson, Business Projector Epson EB-L30000U / L30002U, 7 pgs.

* cited by examiner

*Primary Examiner* — Magda Cruz
(74) *Attorney, Agent, or Firm* — Dority & Manning. P.A.

(57) ABSTRACT

A second controller executes processing including displaying a pattern image including a plurality of control points and a plurality of line segments connecting control points of the plurality of control points, receiving an input indicating a first position on the pattern image, selecting at least two vertexes of a smallest first polygon overlapping the first position among polygons formed by the plurality of line segments, and displaying mark images indicating that the at least two vertexes were selected.

15 Claims, 16 Drawing Sheets

FIG. 2

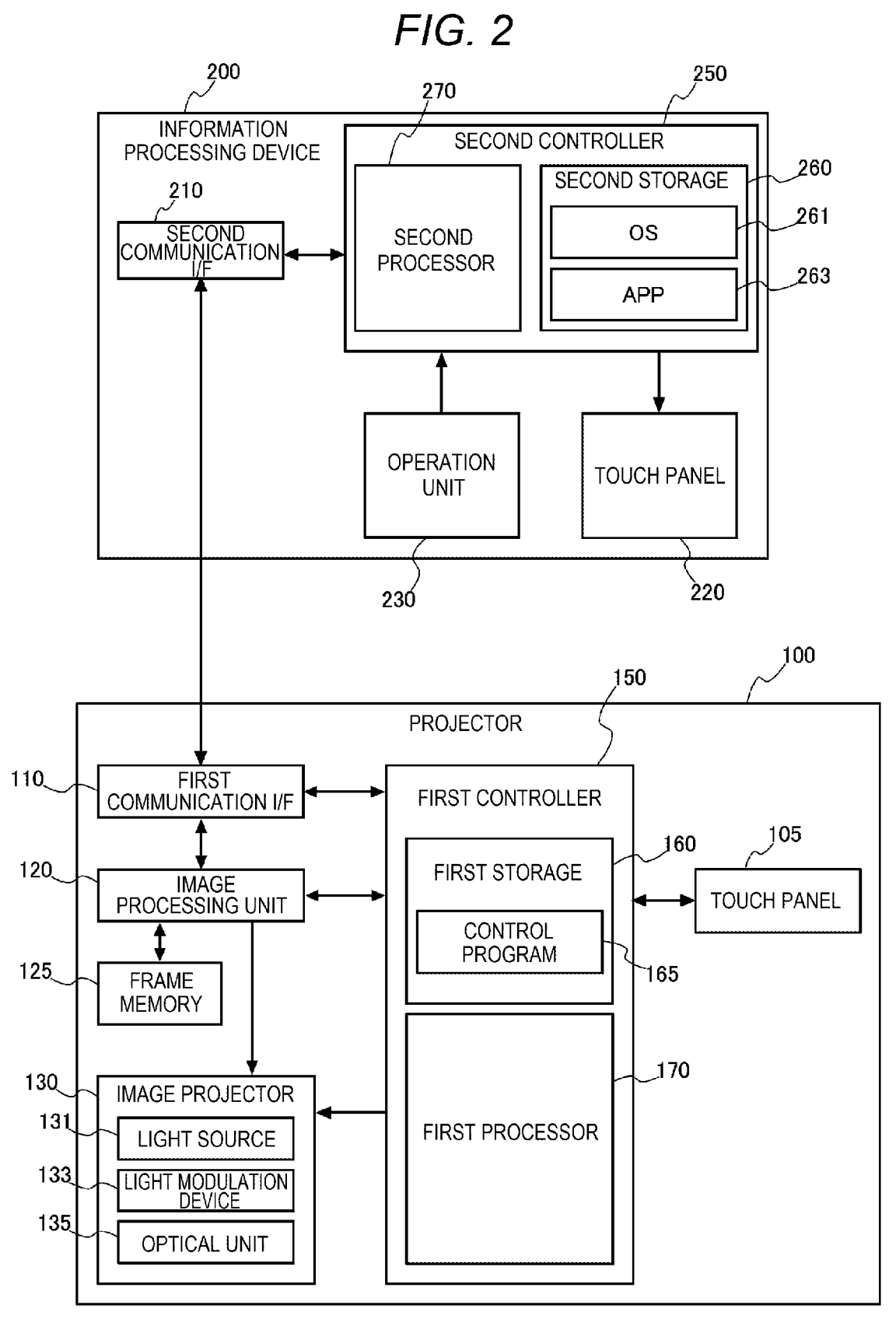

INFORMATION PROCESSING DEVICE
200
210
SECOND COMMUNICATION I/F
SECOND CONTROLLER
250
270
SECOND PROCESSOR
SECOND STORAGE
260
OS
261
APP
263
OPERATION UNIT
230
TOUCH PANEL
220
PROJECTOR
100
150
110
FIRST COMMUNICATION I/F
FIRST CONTROLLER
120
IMAGE PROCESSING UNIT
FIRST STORAGE
160
CONTROL PROGRAM
165
TOUCH PANEL
105
125
FRAME MEMORY
130
IMAGE PROJECTOR
131
LIGHT SOURCE
133
LIGHT MODULATION DEVICE
135
OPTICAL UNIT
FIRST PROCESSOR
170

FIG. 7

225
50
301
50
300
N
M
315
Y AXIS
X AXIS

DISPLAY METHOD, PROJECTOR, AND NON-TRANSITORY COMPUTER-READABLE STORAGE MEDIUM STORING PROGRAM

The present application is based on, and claims priority from JP Application Serial Number 2022-166063, filed Oct. 17, 2022, the disclosure of which is hereby incorporated by reference herein in its entirety.

BACKGROUND

1. Technical Field

The present disclosure relates to a display method, a projector, and a non-transitory computer-readable storage medium storing a program.

2. Related Art

There has been known a device including a function of correcting local distortion of an image to be displayed by a projector.

For example, an information processing device disclosed by JP-A-2021-136502 (Patent Literature 1) acquires, from an imaging device, a captured image obtained by capturing a projected image and causes a display to display the acquired captured image. When setting, according to a designated coordinate designated by cursor operation of a user, positions of adjustment points on the captured image to be displayed, the information processing device sets a search range centering on the designated coordinate. Further, when any one characteristic portions among edges, straight lines, and intersections of the straight lines are included in the set search range, the information processing device sets the positions of the adjustment points in the positions of the characteristic portions and adjusts the projector to transform the projected image into a shape corresponding to the adjustment points, the positions of which have been set.

However, characteristic portions deviating from the search range cannot be searched. If the search range is carelessly set large, characteristic portions originally not desired to be selected are sometimes selected. Therefore, it is difficult to select a plurality of characteristic portions in response to the user's operation for selecting one position.

SUMMARY

An aspect of the present disclosure is a display method including: displaying a first image including a point group and a line segment group connecting a point and a point included in the point group; receiving an input indicating a first position on the first image; selecting at least two vertexes of a smallest first polygon overlapping the first position among polygons formed by the line segment group; and displaying marks indicating that the at least two vertexes were selected.

An aspect of the present disclosure is a projector including: an optical device; and a processor configured to execute: displaying, using the optical device, a first image including a point group and a line segment group connecting a point and a point included in the point group; receiving an input indicating a first position on the first image; selecting at least two vertexes of a smallest polygon overlapping the first position among polygons formed by the line segment group; and displaying, using the optical device, marks indicating that the at least two vertexes were selected.

An aspect of the present disclosure is a non-transitory computer-readable storage medium storing a program for causing a computer to execute: displaying a first image including a point group and a line segment group connecting a point and a point included in the point group; receiving an input indicating a first position on the first image; selecting at least two vertexes of a smallest polygon overlapping the first position among polygons formed by the line segment group; and displaying marks indicating that the at least two vertexes were selected.

BRIEF DESCRIPTION OF THE DRAWINGS

FIG. 2 is a block diagram showing configurations of a projector and an information processing device.

FIG. 7 is a diagram showing a display state of the pattern image after the click operation.

FIG. 8 shows a drag range on the pattern image designated by drag operation.

FIG. 9 is a diagram showing a display state of the pattern image after the drag operation.

FIG. 12 is a diagram showing a display state of the pattern image in the case in which the rectangular figure is selected again.

FIG. 14 is a diagram showing a display state of the pattern image after the rectangular figure is selected again.

FIG. 16 is a flowchart showing the operation of the information processing device.

DESCRIPTION OF EMBODIMENTS

1. System Configuration

An embodiment of the present disclosure is explained below with reference to the accompanying drawings.

Figure 1:
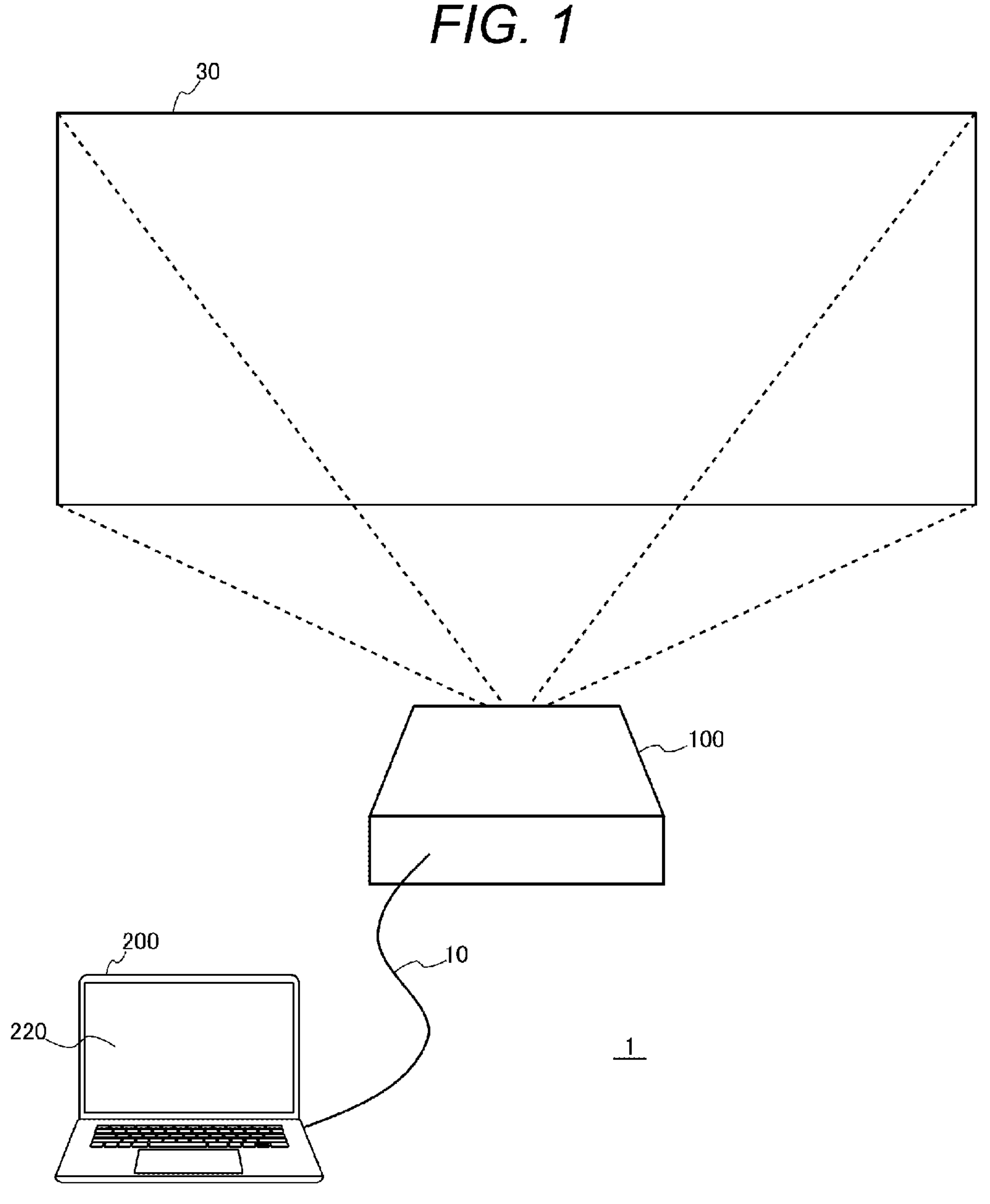
FIG. 1 is a diagram showing a system configuration of a display system.

FIG. 1 is a diagram showing a system configuration of a display system 1.

The display system 1 includes a projector 100, which is a display device, and an information processing device 200 that supplies, to the projector 100, a display image that is an image to be displayed on a projection surface 30 by the projector 100.

The projector 100 and the information processing device 200 are connected by a cable 10. In FIG. 1, a configuration in which the projector 100 and the information processing device 200 are connected by the cable 10 is shown. However, the projector 100 and the information processing device 200 may be connected by radio.

The projector 100 generates image light based on a display image supplied from the information processing device 200. The projector 100 projects the generated image light onto the projection surface 30 in an enlarged form. Consequently, the display image is displayed on the projection surface 30.

The information processing device 200 supplies the display image to the projector 100 and corrects local distortion of the display image that the information processing device 200 causes the projector 100 to display. As the information processing device 200, a personal computer such as a desktop personal computer, a notebook personal computer, or a tablet personal computer is used. A portable terminal such as a smartphone may be used as the information processing device 200.

2. Configuration of the Projector

FIG. 2 is a block diagram showing configurations of the projector 100 and the information processing device 200.

First, the configuration of the projector 100 is explained. The projector 100 includes a touch panel 105, a first communication interface 110, an image processor 120, a frame memory 125, an image projector 130, and a first controller 150. Interface is abbreviated as I/F below. The image projector 130 is equivalent to the optical device.

The touch panel 105 includes a display panel and a touch sensor. Illustration of the display panel and the touch sensor is omitted. As the display panel, for example, a liquid crystal panel or an organic EL (Electro Luminescence) panel is used. The touch sensor detects touch operation on the touch panel 105. The touch sensor detects, as the touch operation, a touch in a position on the touch panel 105 touched by a pointer such as an electronic pen or a finger of a user. The touch sensor outputs, to the first controller 150, an operation signal including coordinate information indicating the position on the touch panel 105 where the touch operation is detected. When a first processor 170 included in the projector 100 is equivalent to the processor, the touch panel 105 is equivalent to the optical device.

The first communication I/F 110 is connected to the information processing device 200 via the cable 10 and receives a display image from the information processing device 200. The first communication I/F 110 outputs the received display image to the image processor 120. The first communication I/F 110 is a wired interface including a connection terminal such as a USB (Universal Serial Bus) connector or an Ethernet connector and an interface circuit. Ethernet is a registered trademark. The first communication I/F 110 may be a wireless communication interface.

The frame memory 125 is connected to the image processor 120. The frame memory 125 includes a plurality of banks. The banks have a storage capacity for enabling a display image for one frame to be written in the banks. The frame memory 125 is configured by, for example, an SDRAM (Synchronous Dynamic RAM). The image processor 120 loads the display image input from the first communication I/F 110 in the frame memory 125.

The image processor 120 performs image processing on the display image loaded in the frame memory 125. The image processing performed by the image processor 120 includes, for example, resolution conversion processing or resize processing, correction of a distortion aberration, shape correction processing, digital zoom processing, and adjustment of a tint and luminance of an image. The image processor 120 executes processing designated by the first controller 150 and, according to necessity, performs processing using parameters input from the first controller 150. Naturally, the image processor 120 is also capable of combining and executing a plurality of kinds of image processing among the kinds of processing explained above.

The image processor 120 and the frame memory 125 are configured by, for example, an integrated circuit. The integrated circuit includes an LSI (Large Scale Integration), an ASIC (Application Specific Integrated Circuit), a PLD (Programmable Logic Device), an FPGA (Field-Programmable Gate Array), and an SoC (System-on-a-chip). An analog circuit may be included in a part of a configuration of the integrated circuit. The first controller 150 and the integrated circuit may be combined.

The image projector 130 includes a light source 131, a light modulation device 133, and an optical unit 135.

The light source 131 includes a discharge-type light source lamp such as an ultrahigh pressure mercury lamp or a metal halide lamp or a solid-state light source such as a light emitting diode or a semiconductor laser. Light emitted from the light source 131 is made incident on the light modulation device 133.

The light modulation device 133 includes, as a light modulation element that modulates the light emitted from the light source 131, a transmission-type liquid crystal panel in which liquid crystal is encapsulated between a pair of transparent substrates. Illustration of the liquid crystal panel is omitted. The liquid crystal panel includes a panel region including a plurality of pixels arrayed in a matrix. The light modulation device 133 applies, to the pixels of the panel region, a driving voltage corresponding to the display image input from the image processor 120 and changes light transmittance of the pixels to transmittance corresponding to the display image. The light emitted from the light source 131 is transmitted through the liquid crystal panel to be modulated and image light corresponding to the display image is generated.

The light modulation element included in the light modulation device 133 is not limited to the transmission-type liquid crystal panel and, for example, may be a reflection-type liquid crystal panel or may be a DMD (Digital Micromirror Device).

The optical unit 135 includes a not-shown projection lens and projects the image light modulated by the light modulation device 133 onto the projection surface 30 in an enlarged form. Consequently, a display image, which is an image corresponding to the image light, is displayed on the projection surface 30.

The first controller 150 is a computer device including a first storage 160 and a first processor 170.

The first storage 160 includes a RAM (Random Access Memory) and a ROM (Read Only Memory). The RAM is used for temporary storage of various data and the like. The ROM stores a control program 165 for controlling an operation of the projector 100, various kinds of setting information, and the like.

The first processor 170 is an arithmetic processing device configured by a CPU (Central Processing Unit) or an MPU (Micro Processor Unit). The first processor 170 executes a control program to control the units of the projector 100. The first processor 170 may be configured by a single processor or can also be configured by a plurality of processors. The first processor 170 may be configured by an SoC (System-on-a-chip) integrated with a part or the entire first storage 160 and other circuits. The first processor 170 may be configured by a combination of a CPU that executes a program and a DSP (Digital Signal Processor) that executes predetermined arithmetic processing. Further, all of the functions of the first processor 170 may be implemented in hardware or may be configured using a programmable device.

3. Configuration of the Information Processing Device

Subsequently, a configuration of the information processing device 200 is explained.

The information processing device 200 includes a second communication I/F 210, a touch panel 220, an operation unit 230, and a second controller 250.

The second communication I/F 210 is a wired interface including a connection terminal such as a USB connector or an Ethernet connector and an interface circuit. The second communication I/F 210 performs data communication with the projector 100 via the cable 10. The second communication I/F 210 may be a wireless communication interface.

The touch panel 220 includes a display panel and a touch sensor. Illustration of the display panel and the touch sensor is omitted. As the display panel, for example, a liquid crystal panel or an organic EL panel is used. The touch sensor detects touch operation on the touch panel 220. The touch sensor detects, as the touch operation, a touch in a position on the touch panel 220 touched by a pointer such as an electronic pen or a finger of the user. The touch sensor outputs, to the second controller 250, an operation signal including coordinate information indicating the position on the touch panel 220 where the touch operation has been detected.

The operation unit 230 includes input devices such as a mouse and a keyboard and receives operation of the user. The operation unit 230 outputs, to the second controller 250, an operation signal corresponding to the received operation.

The second controller 250 includes a second storage 260 and a second processor 270.

The second storage 260 includes a RAM and a ROM. The second storage 260 may include an auxiliary storage device such as an SSD (Solid State Drive) or an HDD (Hard Disk Drive).

The RAM is used for temporary storage of various data and the like. The ROM stores control programs such as an OS (Operating System) 261 for controlling an operation of the information processing device 200 and an application program 263 and various kinds of setting information. The application program 263 is described as APP 263 below.

The second processor 270 is an arithmetic processing device configured by a CPU or an MPU. The second processor 270 executes the OS 261 and the APP 263 to control the units of the information processing device 200. The second processor 270 may be configured by a single processor or can also be configured by a plurality of processors.

The second controller 250 that executes the APP 263 includes a point correction function for correcting local distortion of a display image that the second controller 250 causes the projector 100 to display.

The second controller 250 generates a correction parameter for correcting, with the point correction function, the display image that the second controller 250 causes the projector 100 to display. The second controller 250 corrects the display image using the generated correction parameter and transmits the corrected display image to the projector 100. The display image is equivalent to the second image.

An operation of the second controller 250 generating the correction parameter is explained below.

In order to generate the correction parameter, first, the second controller 250 causes the touch panel 220 of the information processing device 200 to display a pattern image 300 equivalent to the first image.

Figure 3:
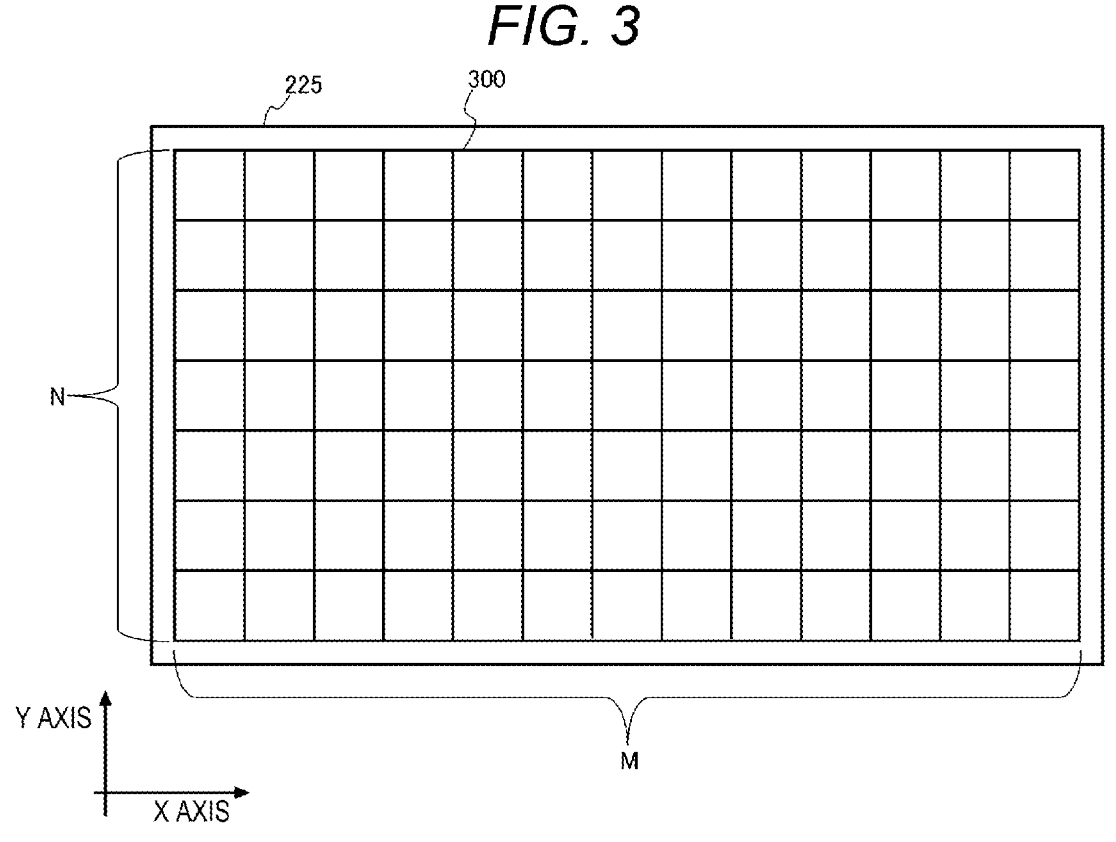
FIG. 3 is a diagram showing an example of a pattern image.

FIG. 3 is a diagram showing an example of the pattern image 300 displayed on an APP screen 225.

The APP screen 225 is a screen displayed on the touch panel 220 when the second controller 250 executes the APP 263.

An X axis shown in FIG. 3 is an axis parallel to the lateral direction of the touch panel 220 and a Y axis shown in FIG. 3 is an axis parallel to the longitudinal direction of the touch panel 220.

In the pattern image 300, M vertical lines are arranged at equal intervals in the X-axis direction and N horizontal lines are arranged at equal intervals in the Y-axis direction. M and N are any natural numbers. The pattern image 300 is a figure of a rectangle. A smallest region divided by two vertical lines and two horizontal lines is also a figure of a rectangle. The rectangle, which is the smallest region, is equivalent to the smallest polygon. The smallest region divided by the two vertical lines and the two horizontal lines is hereinafter referred to as rectangular figure.

Control points are set at intersections of the M vertical lines arranged in the X-axis direction of the pattern image 300 and the N horizontal lines arranged in the Y-axis direction of the pattern image 300. A plurality of control points set at the intersections are equivalent to the point group. The control points adjacent to one another are connected by line segments of parts of the vertical lines and the horizontal lines explained above. A plurality of line segments connecting the adjacent control points are equivalent to the line segment group.

The control points are points, positions of which on the pattern image 300 can be changed by touch operation on the touch panel 220 or operation of the operation unit 230 performed by the user in point correction. A correction parameter is generated based on positions on the pattern image 300 of the control points before the change of the positions thereof and positions on the pattern image 300 of the control points after the change of the positions thereof. In the following explanation, a case in which operation such as selection of the control points and movement of the control points is performed by the mouse included in the operation unit 230 is explained.

When the pattern image 300 is displayed on the touch panel 220, the user designates positions and ranges on the pattern image 300 with click operation and drag operation of the mouse.

The operation unit 230 detects the click operation and the drag operation of the mouse and outputs, to the second controller 250, an operation signal including coordinate information indicating the positions and the ranges of these kinds of operation. The second controller 250 acquires coordinate information from the operation signal input thereto. When the acquired coordinate information indicates a position on the touch panel 220, the second controller 250 determines an image overlapping the position indicated by the coordinate information.

Figure 4:
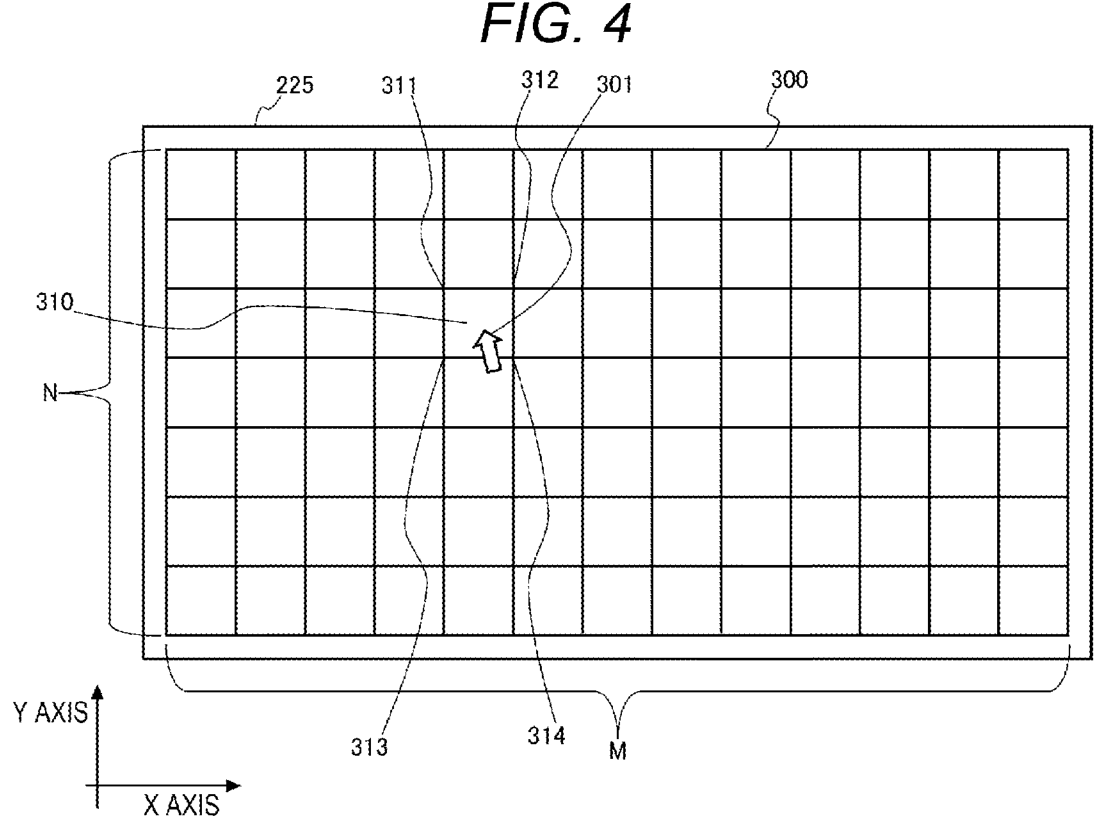
FIG. 4 is a diagram showing a case in which a rectangular figure overlaps a position of click operation.

FIG. 4 is a diagram showing a case in which a rectangular FIG. 310 overlaps a designated position designated by the click operation. A designated position of a cursor 301 shown in FIG. 4 indicates a position designated by the click operation of the mouse. The position designated by the click operation is equivalent to the first position. The second controller 250 inputting coordinate information indicating the designated position designated by the click operation is equivalent to the receiving the input indicating the first position.

When the rectangular FIG. 310 overlaps the position on the touch panel 220 indicated by the coordinate information, the second controller 250 selects control points located at least at two vertexes of the rectangular FIG. 310 and brings the control points into a selected state.

More specifically, when the position on the touch panel 220 indicated by the coordinate information does not overlap a line segment forming a side of the rectangular FIG. 310 and the coordinate information indicates a position in the rectangular FIG. 310, the second controller 250 brings control points located at four vertexes of the rectangular FIG. 310 into the selected state. In an example illustrated in FIG. 4, a control point 311 on the upper left, a control point 312 on the upper right, a control point 313 on the lower left, and a control point 314 on the lower right of the rectangular FIG. 310 in a drawing view come into the selected state.

Figure 5:
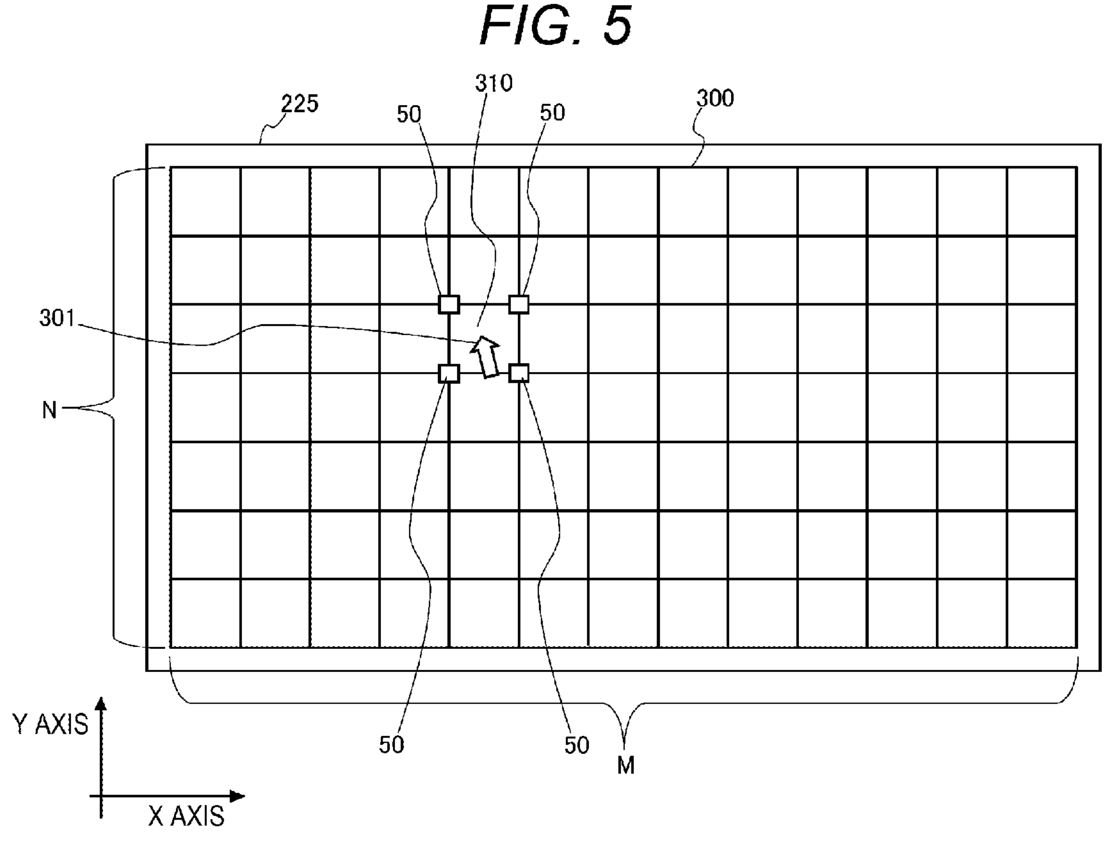
FIG. 5 is a diagram showing a display state of the pattern image after the click operation.

FIG. 5 is a diagram showing a display state of the pattern image 300 after the click operation.

After selecting the control points 311, 312, 313, and 314 located at the four vertexes of the rectangular FIG. 310, the second controller 250 displays mark images 50 in the positions of the control points 311, 312, 313, and 314. By displaying the mark images 50 in the positions of the control points 311, 312, 313, and 314, the second controller 250 can cause the user to recognize that the control points 311, 312, 313, and 314 are in the selected state.

Note that, although the mark images 50 having a rectangular shape are shown in FIG. 5, a shape and a color of the mark images 50 are optional. The mark images 50 only have to be in a state in which the user can recognize that a display state of the control points 311, 312, 313, and 314 is different from a display state of other control points.

Figure 6:
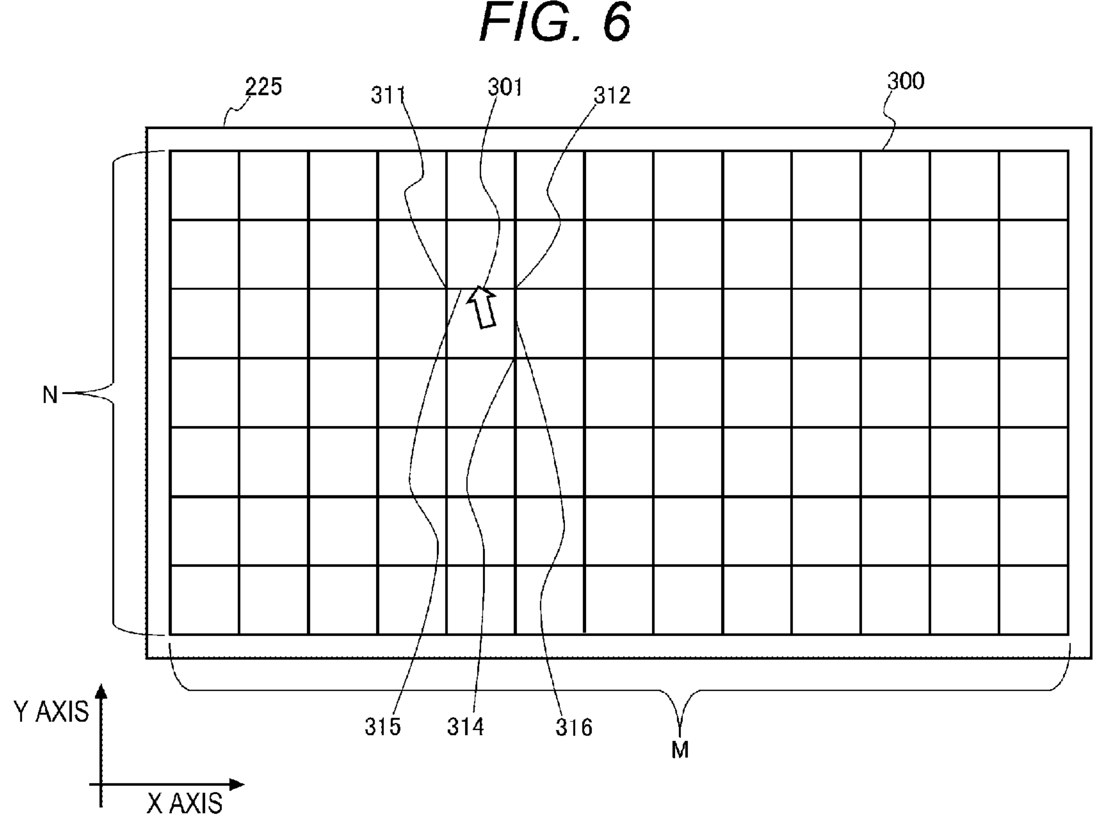
FIG. 6 is a diagram showing a case in which a line segment of the rectangular figure overlaps the position of the click operation.

FIG. 6 is a diagram in which a designated position of the click operation indicates a position on the pattern image 300. In particular, FIG. 6 is a diagram showing a case in which a line segment 315 forming a side of the rectangular FIG. 310 overlaps a designated position of the click operation indicated by the cursor 301.

When the line segment 315 forming the side of the rectangular FIG. 310 overlaps the position on the touch panel 220 indicated by the coordinate information, the second controller 250 selects control points located at both ends of the line segment 315 and brings the control points into the selected state. In an example shown in FIG. 6, the control point 311 located at the vertex at the left end of the line segment 315 and the control point 312 located at the vertex at the right end of the line segment 315 in a drawing view come into the selected state.

Figure 7:
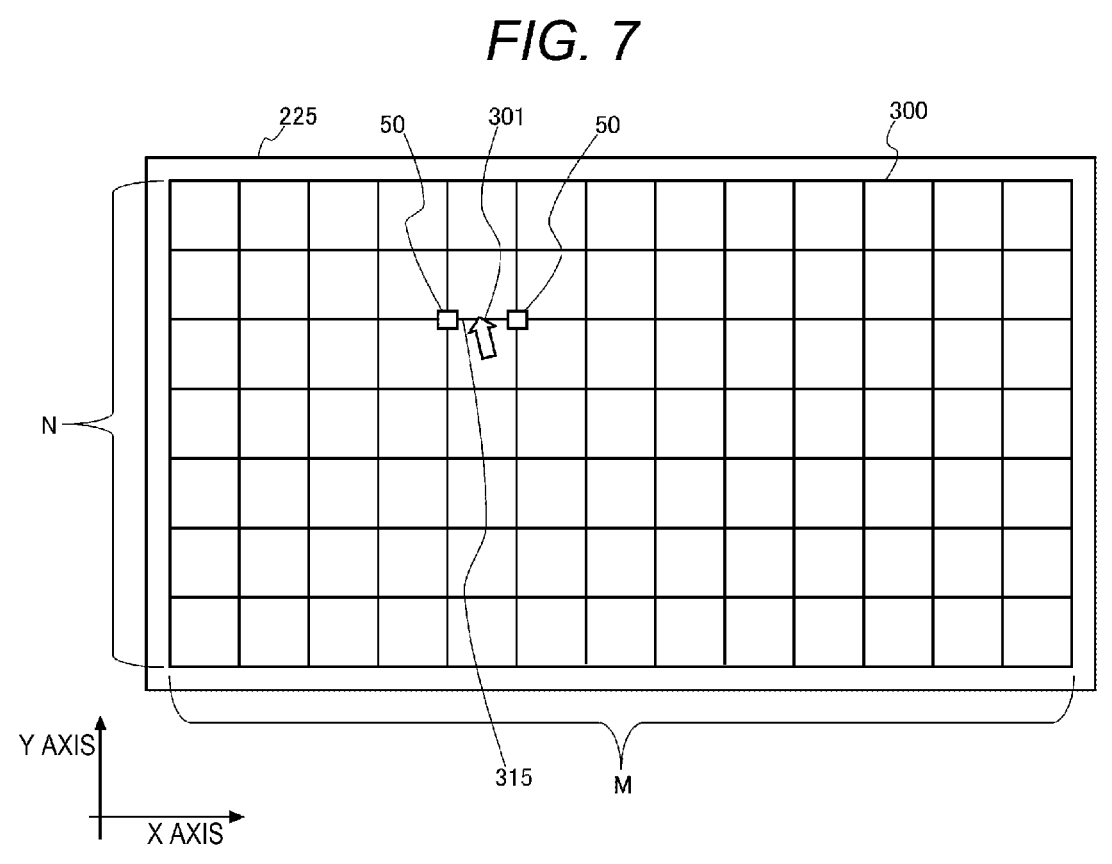

FIG. 7 is a diagram showing a display state of the pattern image 300 after the click operation. In particular, FIG. 7 is a diagram showing a state in which the mark images 50 are displayed at both the ends of the line segment 315 selected by the click operation.

After selecting the control points 311 and 312 located at both the ends of the line segment 315, the second controller 250 displays the mark images 50 in the positions of the control points 311 and 312. Consequently, the second controller 250 can cause the user to recognize that the control points 311 and 312 on which the mark images 50 are displayed to be superimposed are in the selected state.

In examples shown in FIGS. 6 and 7, since the line segment 315 parallel to the X axis is selected by the click operation, the control points 311 and 312 at both the left and right ends of the line segment 315 are selected. For example, when a line segment 316 parallel to the Y axis is selected by the click operation, the control points 312 and 314 at both the upper and lower ends of the line segment 316 are selected and brought into the selected state.

Figure 8:
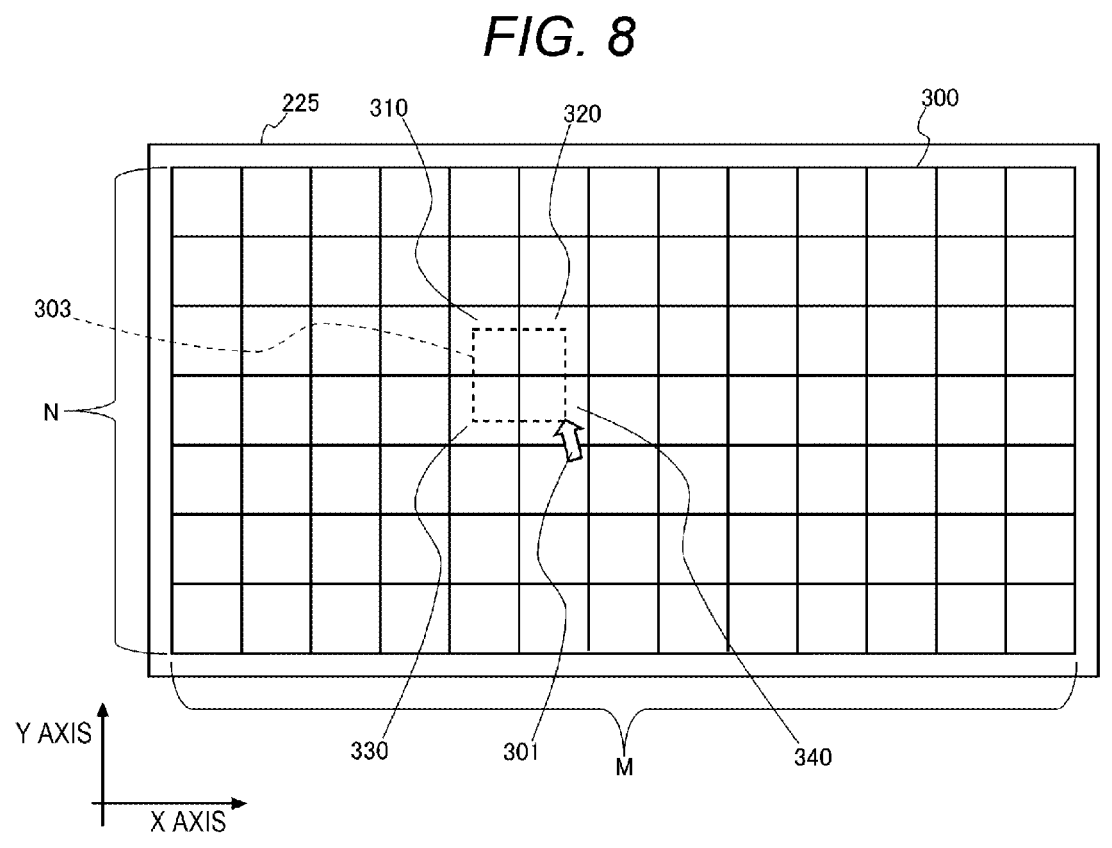

FIG. 8 is a diagram showing a drag range on the pattern image 300 designated by the drag operation. A range indicated by a broken line in FIG. 8 indicates a drag range 303 selected by the drag operation of the mouse.

When acquiring the drag range 303, which is coordinate information indicating the range, from an operation signal, the second controller 250 selects a rectangular figure, at least a part of which is included in the drag range 303. In an example shown in FIG. 8, the second controller 250 selects rectangular FIGS. 310, 320, 330, and 340. The rectangular FIG. 320 is located on the right of the rectangular FIG. 310 in a drawing view. The rectangular FIG. 330 is located under the rectangular FIG. 310 in the drawing view. The rectangular FIG. 340 is located under the rectangular FIG. 320 in the drawing view.

Figure 9:
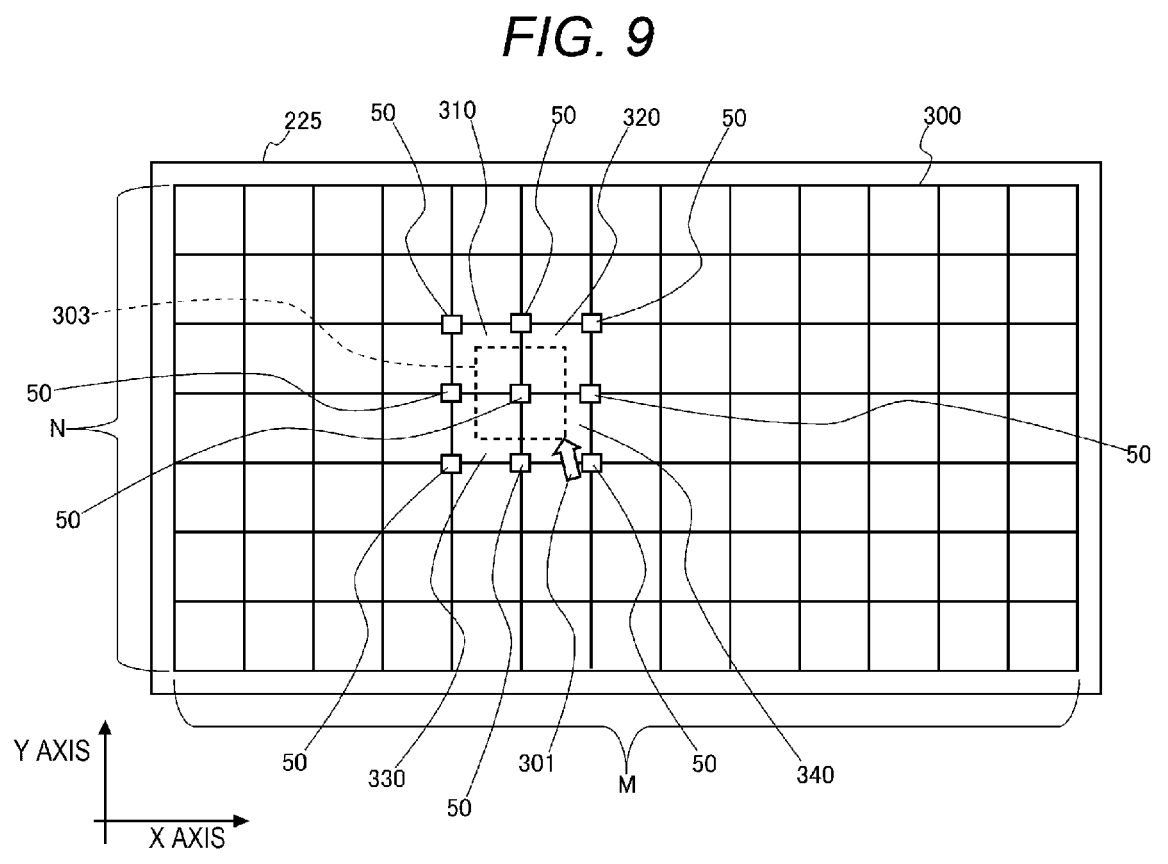

FIG. 9 is a diagram showing a display state of the pattern image 300 after the drag operation.

After selecting the rectangular FIGS. 310, 320, 330, and 340, the second controller 250 brings control points located at all vertexes of these four rectangular FIGS. 310, 320, 330, and 340 into the selected state and displays the mark images 50 to be superimposed on the control points in the selected state. Consequently, the second controller 250 can cause the user to recognize that the control points on which the mark images 50 are displayed to be superimposed are selected.

Figure 10:
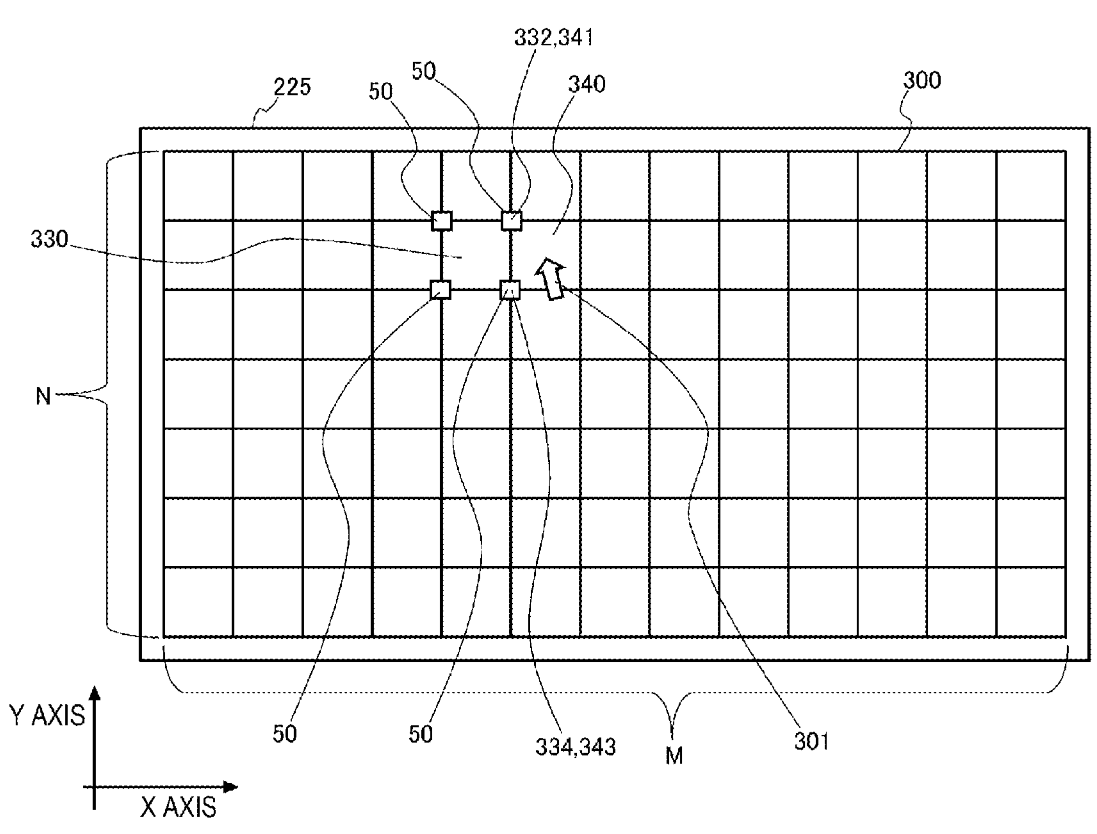
FIG. 10 is a diagram showing a case in which the rectangular figure overlaps the position of the click operation.

FIG. 10 is a diagram showing a state in which the rectangular FIG. 340 overlaps a designated position of the click operation indicated by the cursor 301 and the mark images 50 are displayed at least at a part of control points on the rectangular FIG. 340. A position designated by the click operation is equivalent to the second position. The rectangular FIG. 340 is equivalent to the first polygon. Coordinate information indicating the position designated by the click operation being input to the second controller 250 is equivalent to the receiving the input indicating the second position.

When determining the rectangular FIG. 340 overlapping the position on the touch panel 220 indicated by the coordinate information, the second controller 250 determines whether the mark images 50 are displayed on the control points on the rectangular FIG. 340.

In an example shown in FIG. 10, a state in which, in a drawing view, the mark images 50 are displayed on the control points on the rectangular FIG. 330 that are in contact with the rectangular FIG. 340 on the left side of the rectangular FIG. 340 is shown. In the drawing view, control points 332 and 334 located on the right side of the rectangular FIG. 330 and control points 341 and 343 located on the left side of the rectangular FIG. 340 overlap and are displayed in the same positions. The control point 332 is a control point located at a vertex on the upper right of the rectangular FIG. 330 in the drawing view. The control point 334 is a control point located at a vertex on the lower right of the rectangular FIG. 330 in the drawing view. The control point 341 is a control point located at a vertex on the upper left of the rectangular FIG. 340 in the drawing view. The control point 343 is a control point located at a vertex on the lower left of the rectangular FIG. 340 in the drawing view.

Figure 11:
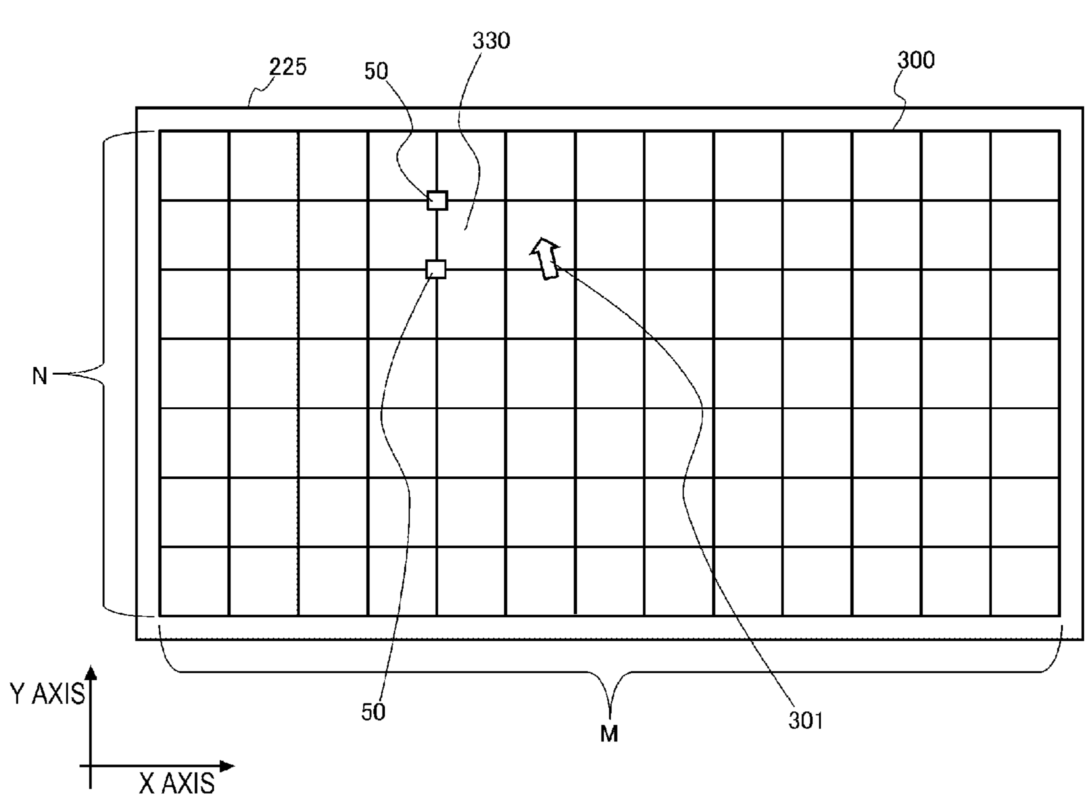
FIG. 11 is a diagram showing a display state of the pattern image after the click operation.

FIG. 11 is a diagram showing a display state of the pattern image 300 after the click operation. In particular, FIG. 11 is a diagram showing a state in which the display of the mark images 50 displayed on the control points 341 and 343 on the rectangular FIG. 340 is erased.

When the mark images 50 are displayed on the control points 341 and 343, which are a part of control points on the rectangular FIG. 340, selected by the click operation, the second controller 250 erases all of the mark images 50 displayed on the control points 341 and 343 on the rectangular FIG. 340. That is, the second controller 250 releases the selected state of the control points on the rectangular FIG. 340 and creates a state in which the mark images 50 are not displayed on the control points.

Figure 12:
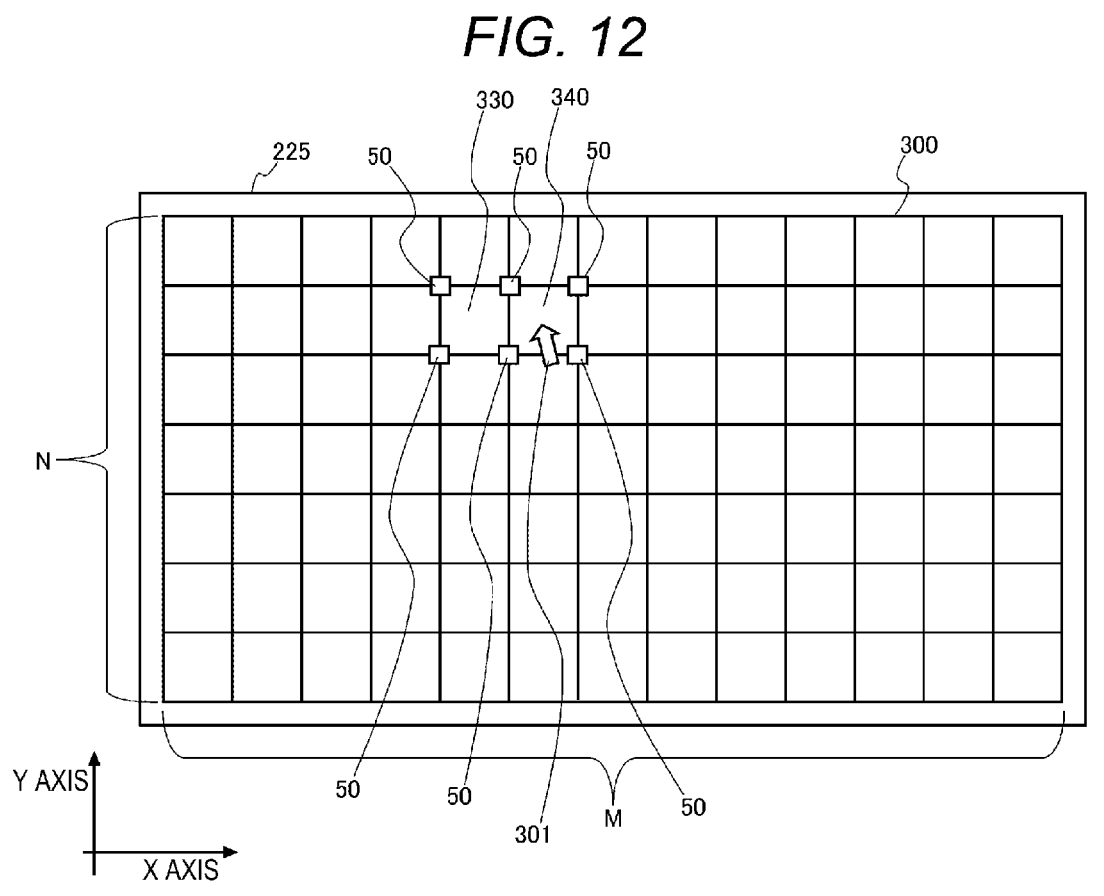

FIG. 12 is a diagram showing a display state of the pattern image 300 in the case in which the rectangular FIG. 340 selected once is selected again.

When the rectangular FIG. 340 is selected again after the display of the mark images 50 on the rectangular FIG. 340 is erased, the second controller 250 brings all the control points on the selected rectangular FIG. 340 into the selected state and displays the mark images 50 to be superimposed on the control points brought into the selected state. Since the mark images 50 are not displayed on the control points on the rectangular FIG. 340, the second controller 250 displays the mark images 50 to be superimposed on the control points located at four vertexes of the rectangular FIG. 340. Consequently, the mark images 50 are displayed to be superimposed on the control points located at sixth vertexes of the rectangular FIG. 330 and the rectangular FIG. 340.

In the above explanation, when the mark images 50 are displayed on a part of the control points on the rectangular FIG. 340 selected by the click operation, the display of the mark images 50 displayed on the control points is erased.

As an operation other than the above, a selection mode for selecting control points and a release mode for releasing the selection of the control points may be provided and the second controller 250 may execute selection of control points and selection release based on an operation mode.

When the selection mode is selected as the operation mode and the rectangular FIG. 340, on a part of the control points of which the mark images 50 are displayed, is selected by the click operation, the second controller 250 selects the remaining control points on the rectangular FIG. 340 and displays the mark images 50 to be superimposed on the selected control points.

When the release mode is selected as the operation mode and the rectangular FIG. 340, on a part of the control points of which the mark images 50 are displayed, is selected by the click operation, the second controller 250 releases the selection of the control points, on which the mark images 50 are displayed, on the selected rectangular FIG. 340. Further, the second controller 250 erases the mark images 50 displayed on the control points on the rectangular FIG. 340, the selection of which is released.

The position selected by the click operation is equivalent to the third position, the rectangular FIG. 330 is equivalent to the first polygon on which the marks are displayed, and the rectangular FIG. 340 is equivalent to the second polygon adjacent to the first polygon. The coordinate information indicating the position selected by the click operation being input to the second controller 250 is equivalent to the receiving the input indicating the third position.

Figure 13:
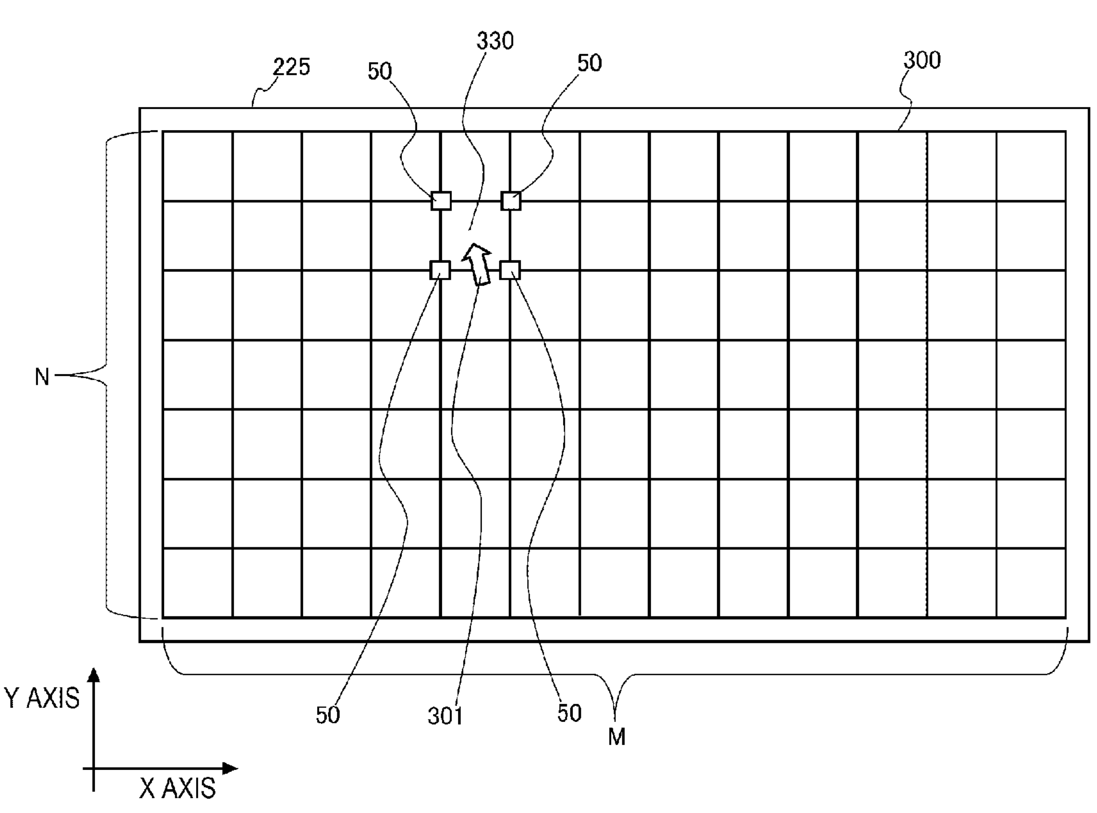
FIG. 13 is a diagram showing a state in which a rectangular figure in which mark images are displayed is selected again.
Figure 14:
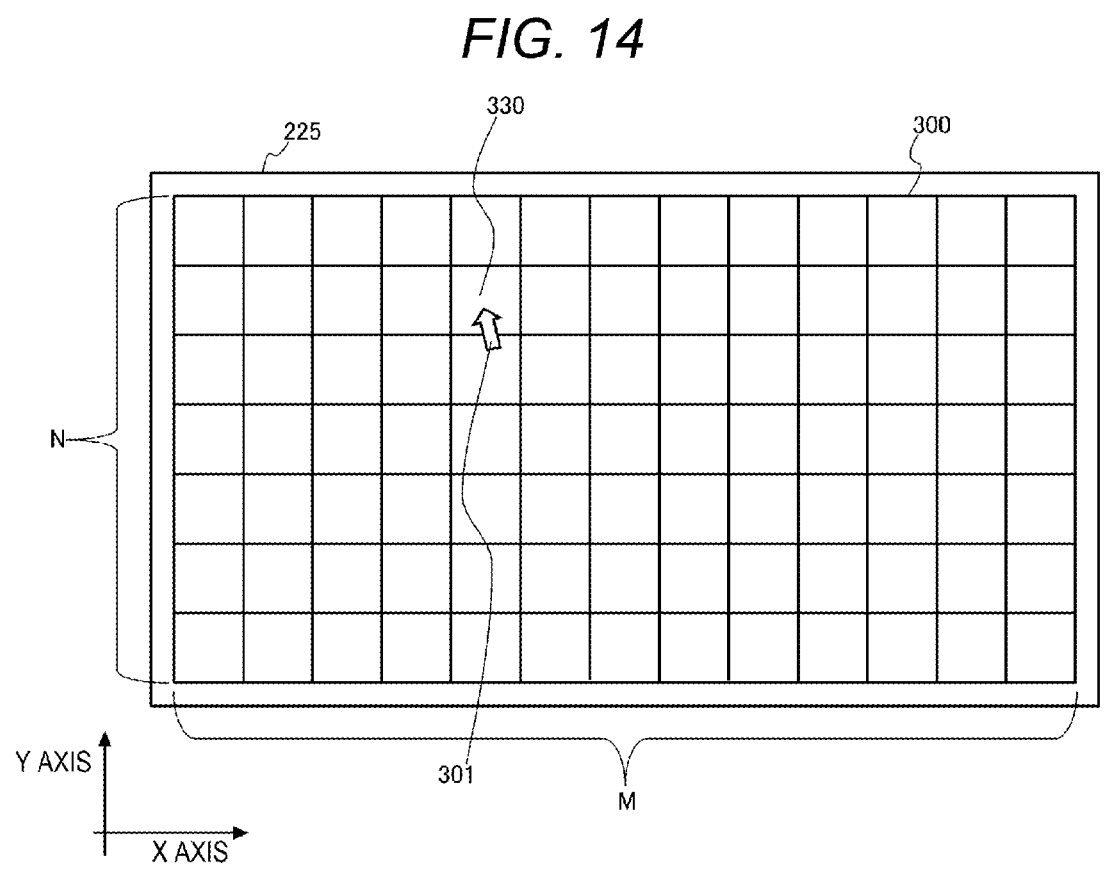

FIG. 13 is a diagram showing a state in which the rectangular FIG. 330 on which the mark images 50 are displayed is selected again by the click operation. FIG. 14 is a diagram showing a display state of the pattern image 300 after the rectangular FIG. 330 is selected again by the click operation.

When the rectangular FIG. 330, on the four vertexes of which the mark images 50 have already been displayed, is selected again by the click operation, the second controller 250 releases the selection of the control points at the four vertexes on the rectangular FIG. 330 that is in the selected state. As shown in FIG. 14, the second controller 250 erases the display of the mark images 50 displayed to be superimposed on the control points at the four vertexes of the rectangular FIG. 330. Consequently, the user can erase the mark images 50 once displayed by the click operation.

Thereafter, the second controller 250 receives moving operation for moving the positions of the selected control points. According to the moving operation, the second controller 250 acquires a movement amount for moving the control points and a moving direction for moving the control points.

Subsequently, for example, when receiving, through a menu icon or the like displayed on the APP screen 225, instruction operation for instructing execution of point correction, the second controller 250 starts the point correction. The second controller 250 calculates, based on the acquired movement amount and the acquired moving direction, coordinates after the movement of the selected control points. Subsequently, the second controller 250 generates a correction parameter based on coordinates before the movement of the control points and the coordinates after the movement. The second controller 250 corrects a display image using the generated correction parameter. The second controller 250 transmits the corrected display image to the projector 100 and causes the projector 100 to display the display image on the projection surface 30.

4. Operation of the Information Processing Device

Figure 15:
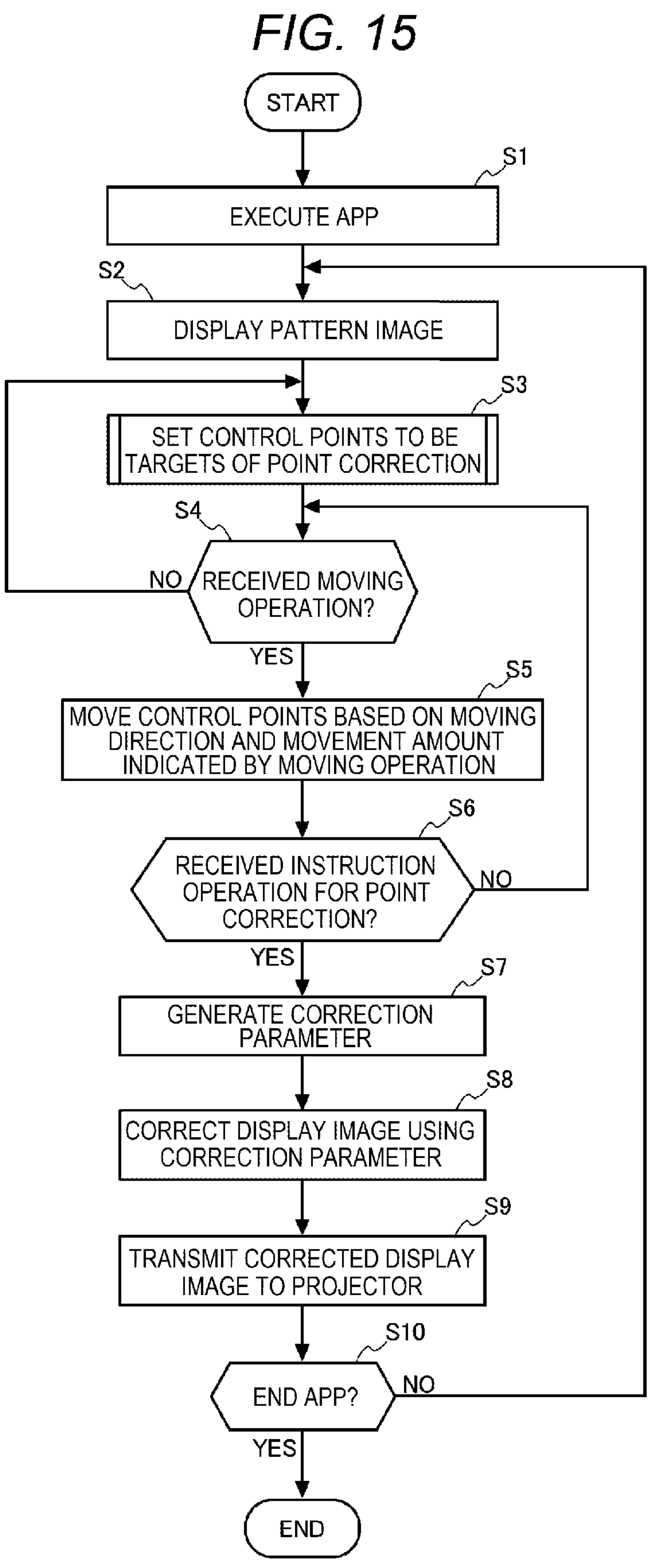
FIG. 15 is a flowchart showing an operation of the information processing device.
Figure 16:
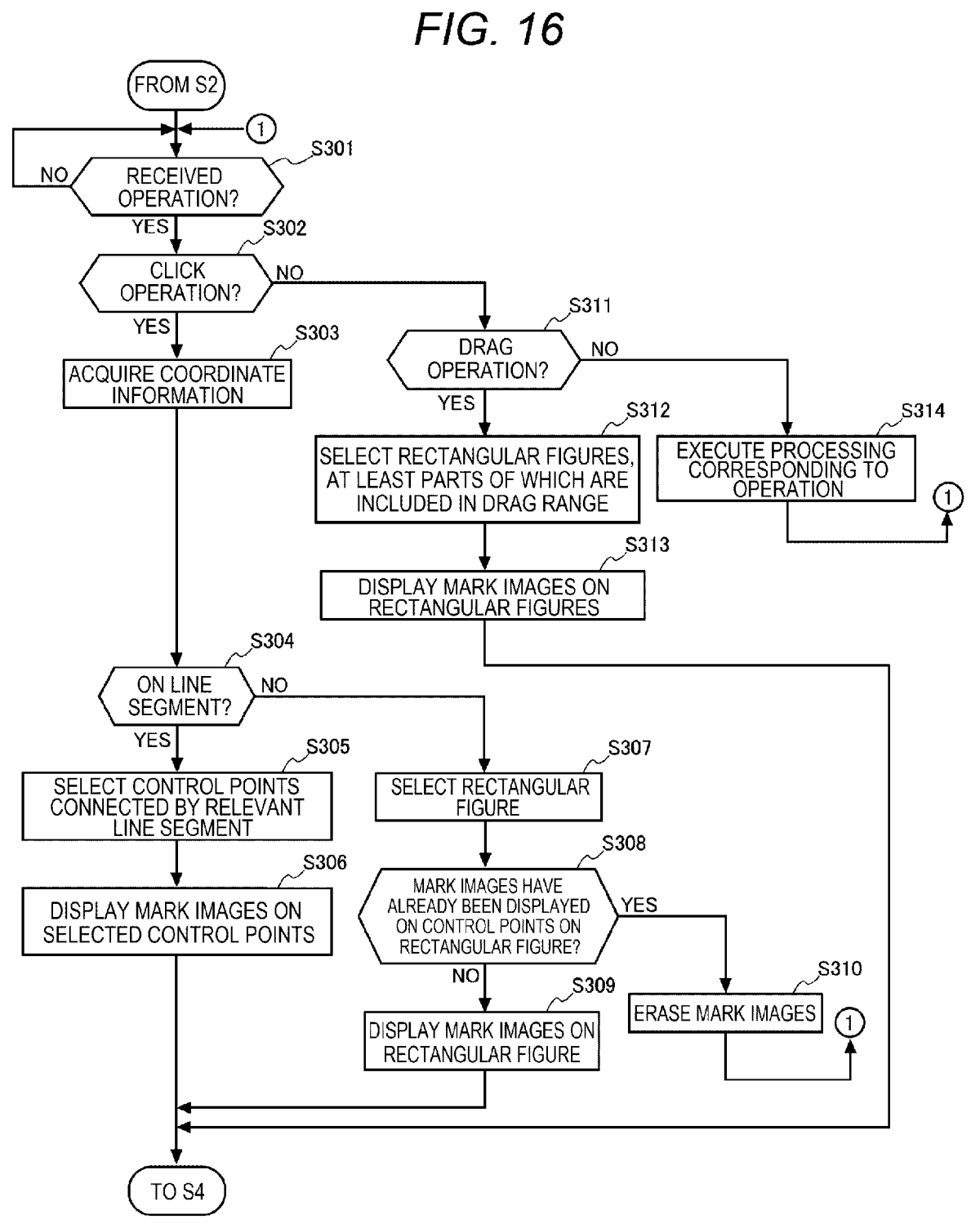

FIGS. 15 and 16 are flowcharts showing an operation of the information processing device 200.

The operation of the information processing device 200 is explained with reference to the flowcharts shown in FIGS. 15 and 16.

When receiving, through the touch panel 220 or the operation unit 230, operation for selecting the APP 263, the second controller 250 executes the APP 263 (step S1) and causes the touch panel 220 to display the APP screen 225. When the point correction is selected through menu operation on the APP screen 225, the second controller 250 causes the APP screen 225 to display the pattern image 300 (step S2).

Subsequently, the second controller 250 receives operation for setting control points to be correction targets of the point correction (step S3). Details of the processing in step S3 are explained with reference to the flowchart of FIG. 16.

When the control points to be the correction targets of the point correction are set, the second controller 250 determines whether the second controller 250 has received moving operation for moving the positions of the set control points (step S4). The moving operation may be operation by the mouse or may be operation by a cross key provided in the keyboard. For example, when having not received the moving operation (step S4/NO) and, for example, having received operation of a return button displayed on the APP screen 225, the second controller 250 returns to the setting of control points to be correction targets of the point correction (step S3).

When having received the moving operation (step S4/YES), the second controller 250 moves, based on a moving direction and a movement amount indicated by the received moving operation, positions on the pattern image 300 of the set control points (step S5).

Subsequently, the second controller 250 determines whether the second controller 250 has received instruction operation for instructing execution of the point correction (step S6). When having not received the instruction operation for the point correction (step S6/NO), the second controller 250 returns to the determination in step S4 and determines whether the moving operation has been further received (step S4).

When having received the instruction operation for the point correction (step S6/YES), the second controller 250 generates a correction parameter (step S7). The second controller 250 generates the correction parameter based on coordinates indicating positions on the pattern image 300 before movement of the selected control points and coordinates indicating positions on the pattern image 300 after the movement (step S7).

Subsequently, the second controller 250 corrects, using the generated correction parameter, the second image that the second controller 250 causes the projector 100 to display (step S8). The second controller 250 transmits the corrected second image to the projector 100 (step S9).

Subsequently, the second controller 250 determines whether the second controller 250 has received operation for ending the APP 263 (step S10). When having not received the operation for ending the APP 263 (step S10/NO), the second controller 250 returns to step S2 and causes the touch panel 220 to display the pattern image 300. When having received the operation for ending the APP 263 (step S10/YES), the second controller 250 ends this processing flow.

FIG. 16 is a flowchart showing details of step S3 shown in FIG. 15.

The details of step S3 are explained with reference to FIG. 16.

First, the second controller 250 determines whether the second controller 250 has received operation of the mouse (step S301). When having not received the operation of the mouse (step S301/NO), the second controller 250 stays on standby until receiving the operation of the mouse.

When having received the operation of the mouse (step S301/YES), the second controller 250 determines whether the received operation is click operation (step S302). When the received operation is the click operation of the mouse (step S302/YES), the second controller 250 acquires coordinate information indicating a position on the pattern image 300 where the click operation is received (step S303).

Subsequently, the second controller 250 determines whether the position on the pattern image 300 indicated by the acquired coordinate information is a position on a line segment (step S304). When the position indicated by the coordinate information is a position on a line segment (step S304/YES), the second controller 250 selects two control points connected by the line segment (step S305). The second controller 250 displays, on the selected two control points, the mark images 50 indicating that the control points have been selected (step S306). Thereafter, the second controller 250 shifts to the determination in step S4.

When the position on the pattern image 300 indicated by the acquired coordinate information is not a position on a line segment (step S304/NO), the second controller 250 selects a smallest rectangular figure including the position indicated by the coordinate information on the inside (step S307). The second controller 250 determines whether the mark images 50 have already been displayed on control points located at vertexes of the selected rectangular figure (step S308).

When the mark image 50 is displayed on at least one of the control points located at the vertexes of the selected rectangular figure (step S308/YES), the second controller 250 erases the displayed mark image 50 (step S310) and returns to the determination in step S301. When the mark images 50 are not displayed on the control points located at the vertexes of the selected rectangular figure (step S308/NO), the second controller 250 displays the mark images 50 on control points located at four vertexes of the rectangular figure (step S309). Thereafter, the second controller 250 shifts to the determination in step S4.

When the operation received in step S301 is not the click operation (step S302/NO), the second controller 250 determines whether the received operation is drag operation (step S311). When the received operation is the drag operation (step S311/YES), the second controller 250 selects all rectangular figures, at least parts of which are included in a drag range of the drag operation (step S312). The second controller 250 displays the mark images 50 on four vertexes of all the selected rectangular figures (step S313). Thereafter, the second controller 250 shifts to the determination in step S4.

When the operation received in step 301 is not the drag operation (step S311/NO) and is menu operation or the like displayed on the APP screen 225, the second controller 250 executes processing corresponding to the received operation (step S314). Therefore, the second controller 250 shifts to the determination in step S301.

5. Summary of the Present Disclosure

A summary of the present disclosure is noted below.

Note 1

A display method including: displaying a first image including a point group and a line segment group connecting a point and a point included in the point group; receiving an input indicating a first position on the first image; selecting at least two vertexes of a smallest first polygon overlapping the first position among polygons formed by the line segment group; and displaying marks indicating that the at least two vertexes were selected.

Consequently, by pointing the first position on the first image, at least two vertexes of the smallest first polygon overlapping the first position are selected. Therefore, a plurality of vertexes of the first polygon can be selected by one operation for pointing the first position. It is possible to improve convenience of a user.

Note 2

The display method described in Note 1, further including: receiving operation for changing positions on the first image of the at least two vertexes; generating a correction parameter based on the positions before the change and positions after the change of the at least two vertexes; correcting, based on the correction parameter, a second image to be displayed on a display surface; and displaying the second image on the display surface with a display device.

Consequently, by selecting vertexes of the polygon included in the first image and changing positions of the selected vertexes, it is possible to improve operability in correcting the second image and improve the convenience of the user.

Note 3

The display method described in Note 1 or 2, wherein the displaying the marks includes, when the first position overlaps a line segment forming a side of the first polygon, selecting two vertexes of the first polygon connected by the line segment and displaying the marks on the two vertexes.

Consequently, by pointing, as the first position, the line segment forming the first polygon, it is possible to select two vertexes of the first polygon connected by the pointed line segment. Therefore, it is possible to improve operability and improve the convenience of the user.

Note 4

The display method described in any one of Notes 1 to 3, wherein the displaying the marks includes, when the first position does not overlap a line segment forming a side of the first polygon, selecting all vertexes forming the first polygon and displaying the marks on all the vertexes.

Consequently, by pointing, as the first position, a position not overlapping the line segment forming the first polygon, it is possible to select all vertexes of the first polygon overlapping the first position. Therefore, it is possible to improve operability and improve the convenience of the user.

Note 5

The display method described in any one of Notes 1 to 4, further including: receiving an input indicating a second position on the first image; and, when the second position overlaps the first polygon, releasing the selection of the vertexes of the first polygon and erasing the marks.

Consequently, by pointing, as the second position, a position overlapping the first polygon on which the marks are displayed, it is possible to erase the marks displayed on the vertexes of the first polygon. Therefore, it is possible to release selection of once selected vertexes, improve operability, and improve the convenience of the user.

Note 6

The display method described in Note 5, further including: receiving an input indicating a third position on the first image; and, when the third position is a position overlapping, among the polygons, a smallest second polygon overlapping the second position adjacent to the first polygon, selecting, among vertexes of the second polygon, vertexes other than vertexes overlapping the vertexes of the first polygon and displaying the marks indicating that the vertexes other than the vertexes overlapping the vertexes of the first polygon were selected.

Consequently, even when the second polygon, on a part of the vertexes of which the marks are displayed, is selected, it is possible to display the marks on vertexes on which the marks are not displayed. Therefore, it is possible to improve the operability and improve the convenience of the user.

Note 7

The display method described in any one of Notes 1 to 6, further including receiving range information indicating a range of the first image, wherein the displaying the marks includes: selecting all vertexes of a polygon, at least a part of which is included in the range indicated by the range information; and displaying marks indicating that all the vertexes of the polygon were selected.

Consequently, by pointing the range of the first image, it is possible to select all the vertexes of the polygon, a part of which is included in the pointed range. Therefore, it is possible to improve operability and improve the convenience of the user.

Note 8

A projector including: an optical device; and a processor configured to execute: displaying, using the optical device, a first image including a point group and a line segment group connecting a point and a point included in the point group; receiving an input indicating a first position on the first image; selecting at least two vertexes of a smallest polygon overlapping the first position among polygons formed by the line segment group; and displaying, using the optical device, a mark indicating that the at least two vertexes were selected.

Consequently, by pointing the first position on the first image, at least two vertexes of the smallest first polygon overlapping the first position are selected. Therefore, it is possible to select a plurality of vertexes of the first polygon according to one operation for pointing the first position. It is possible to improve the convenience of the user.

Note 9

A non-transitory computer-readable storage medium storing a program for causing a computer to execute: displaying a first image including a point group and a line segment group connecting a point and a point included in the point group; receiving an input indicating a first position on the first image; selecting at least two vertexes of a smallest polygon overlapping the first position among polygons formed by the line segment group; and displaying a mark indicating that the at least two vertexes were selected.

Consequently, by pointing the first position on the first image, at least two vertexes of the smallest first polygon overlapping the first position are selected. Therefore, it is possible to select a plurality of vertexes of the first polygon according to one operation for pointing the first position. It is possible to improve the convenience of the user.

7. Other Embodiments

The embodiment explained above is a preferred mode of implementation of the present disclosure. However, the embodiment is not limited to the mode explained above and various modified implementations are possible within a range not departing from the gist of the present disclosure.

For example, the embodiment explained above is explained using, as an example, the pattern image 300 on which the M line segments are arranged in the X-axis direction and the N line segments are arranged in the Y-axis direction. Therefore, the shape of the polygons is the rectangle. However, the shape of the polygons is not limited to the rectangle and may be a shape such as a triangle, a pentagon, or a hexagon.

In the embodiment explained above, the information processing device 200 executes the processing corresponding to the display method. However, a device that executes the display method is not limited to the information processing device 200. For example, when the projector 100 includes the touch panel 105, the first controller 150 may execute, based on touch operation on the touch panel 105, processing corresponding to the display method. That is, the first controller 150 of the projector 100 may execute the processing of the flowcharts of FIGS. 15 and 16.

In FIGS. 15 and 16, the operation shown in the flowcharts of FIGS. 15 and 16 is performed by the mouse and the keyboard included in the operation unit 230. The operation shown in the flowcharts of FIGS. 15 and 16 may be performed by touch operation on the touch panel 220.

The functional units of the information processing device 200 and the projector 100 shown in FIG. 2 indicate functional components. Specific implementation forms of the functional units are not particularly limited. That is, hardware individually corresponding to the functional units does not always need to be implemented. It is naturally possible to adopt a configuration in which one processor executes a program to realize functions of a plurality of functional units. A part of functions realized by software in the embodiment may be realized by hardware. A part of functions realized by hardware in the embodiment may be realized by software. Besides, specific detailed configurations of the other units of the information processing device 200 and the projector 100 can also be optionally changed in a range not departing from the gist of the present disclosure.

Processing units of the flowcharts of FIGS. 15 and 16 are divided according to main processing contents in order to facilitate understanding of the processing of the information processing device 200. The present disclosure is not limited by a method of the division and names of the processing units shown in the flowcharts of FIGS. 15 and 16. The processing of the second controller 250 can also be divided into a larger number of processing units according to processing contents or can also be divided such that one processing unit includes more kinds of processing. The processing order of the flowcharts explained above is not limited to the illustrated example.

When the display method is implemented using a computer included in the information processing device 200 or a computer included in the projector 100, a program to be executed by the computer can also be configured in a form of a recording medium. Alternatively, the program to be executed by the computer can also configured in a form of a transmission medium that transmits the program. As the recording medium, a magnetic or optical recording medium or a semiconductor memory device can be used. Specifically, examples of the recording medium include portable or stationary recording media such as a flexible disk, a HDD, a CD-ROM, a DVD (Digital Versatile Disc), a Blu-ray Disc, a magneto-optical disk, a flash memory, and a card-type recording medium. The recording medium may be a non-volatile storage device such as a RAM, a ROM, or a HDD, which is an internal storage device included in a server device. Blu-ray is a registered trademark.

What is claimed is:

1. A display method comprising:

displaying a first image including a point group and a line segment group connecting a first point included in the point group and a second point included in the point group;

receiving an input indicating a first position on the first image;

selecting at least two vertexes of a smallest first polygon overlapping the first position among polygons formed by the line segment group;

displaying marks indicating that the at least two vertexes were selected;

receiving an input indicating a second position on the first image;

when the second position overlaps the first polygon releasing the selection of the vertexes of the first polygon and erasing the marks;

receiving an input indicating a third position on the first image; and when the third position is a position overlapping, among the polygons, a smallest second polygon overlapping the third position adjacent to the first polygon selecting, among vertexes of the second polygon, vertexes other than vertexes overlapping the vertexes of the first polygon and displaying the marks indicating that the vertexes other than the vertexes overlapping the vertexes of the first polygon were selected.

2. The display method according to claim 1, further comprising:

receiving operation for changing positions on the first image of the at least two vertexes;

generating a correction parameter based on the positions before the change and positions after the change of the at least two vertexes;

correcting, based on the correction parameter, a second image to be displayed on a display surface; and displaying the second image on the display surface with a display device.

3. The display method according to claim 1, wherein the displaying the marks includes, when the first position overlaps a line segment forming a side of the first polygon, selecting two vertexes of the first polygon connected by the line segment and displaying the marks on the two vertexes.

4. The display method according to claim 1, wherein the displaying the marks includes, when the first position does not overlap a line segment forming a side of the first polygon, selecting all vertexes forming the first polygon and displaying the marks on all the vertexes.

5. The display method according to claim 1, further comprising receiving range information indicating a range of the first image, wherein the displaying the marks includes:

selecting all vertexes of a polygon, at least a part of which is included in the range indicated by the range information; and displaying marks indicating that all the vertexes of the polygon were selected.

6. A projector comprising:

an optical device; and a processor configured to execute:

displaying, using the optical device, a first image including a point group and a line segment group connecting a point and a point included in the point group;

receiving an input indicating a first position on the first image;

selecting at least two vertexes of a smallest first polygon overlapping the first position among polygons formed by the line segment group;

displaying, using the optical device, marks indicating that the at least two vertexes were selected;

receiving an input indicating a second position on the first image;

when the second position overlaps the first polygon releasing the selection of the vertexes of the first polygon and erasing the marks;

receiving an input indicating a third position on the first image; and when the third position is a position overlapping, among the polygons, a smallest second polygon overlapping the third position adjacent to the first polygon selecting, among vertexes of the second polygon, vertexes other than vertexes overlapping the vertexes of the first polygon and displaying the marks indicating that the vertexes other than the vertexes overlapping the vertexes of the first polygon were selected.

7. The projector according to claim 6, wherein the processor is further configured to execute:

receiving operation for changing positions on the first image of the at least two vertexes;

generating a correction parameter based on the positions before the change and positions after the change of the at least two vertexes;

correcting, based on the correction parameter, a second image to be displayed on a display surface; and displaying, using the optical device, the second image on the display surface with a display device.

8. The projector according to claim 6, wherein the displaying the marks includes, when the first position overlaps a line segment forming a side of the first polygon, selecting two vertexes of the first polygon connected by the line segment and displaying the marks on the two vertexes.

9. The projector according to claim 6, wherein the displaying the marks includes, when the first position does not overlap a line segment forming a side of the first polygon, selecting all vertexes forming the first polygon and displaying the marks on all the vertexes.

10. The projector according to claim 6, wherein the processor is further configured to execute:

receiving range information indicating a range of the first image, wherein the displaying the marks includes:

selecting all vertexes of a polygon, at least a part of which is included in the range indicated by the range information; and displaying, using the optical device, marks indicating that all the vertexes of the polygon were selected.

11. A non-transitory computer-readable storage medium storing a program for causing a computer to execute:

displaying a first image including a point group and a line segment group connecting a point and a point included in the point group;

receiving an input indicating a first position on the first image;

selecting at least two vertexes of a smallest first polygon overlapping the first position among polygons formed by the line segment group;

displaying marks indicating that the at least two vertexes were selected;

receiving an input indicating a second position on the first image;

when the second position overlaps the first polygon releasing the selection of the vertexes of the first polygon and erasing the marks;

receiving an input indicating a third position on the first image; and when the third position is a position overlapping, among the polygons, a smallest second polygon overlapping the third position adjacent to the first polygon selecting, among vertexes of the second polygon, vertexes other than vertexes overlapping the vertexes of the first polygon and displaying the marks indicating that the vertexes other than the vertexes overlapping the vertexes of the first polygon were selected.

12. The non-transitory computer-readable storage medium according to claim 11, further configured to execute:

a receiving operation for changing positions on the first image of the at least two vertexes;

generating a correction parameter based on the positions before the change and positions after the change of the at least two vertexes;

correcting, based on the correction parameter, a second image to be displayed on a display surface; and displaying the second image on the display surface with a display device.

13. The non-transitory computer-readable storage medium according to claim 11, wherein the displaying the marks includes, when the first position overlaps a line segment forming a side of the first polygon, selecting two vertexes of the first polygon connected by the line segment and displaying the marks on the two vertexes.

14. The non-transitory computer-readable storage medium according to claim 11, wherein the displaying the marks includes, when the first position does not overlap a line segment forming a side of the first polygon, selecting all vertexes forming the first polygon and displaying the marks on all the vertexes.

15. The non-transitory computer-readable storage medium according to claim 11, further configured to execute:

receiving range information indicating a range of the first image, wherein the displaying the marks includes:

selecting all vertexes of a polygon, at least a part of which is included in the range indicated by the range information; and displaying marks indicating that all the vertexes of the polygon were selected.

* * * * *